July 11, 1950 C. H. LANPHIER 2,515,154
TRANSDUCER
Filed July 15, 1946 5 Sheets-Sheet 3

INVENTOR.
Charles H. Lanphier,
BY Brown, Jackson,
Boettcher & Dienner
Attys

July 11, 1950     C. H. LANPHIER     2,515,154
TRANSDUCER
Filed July 15, 1946     5 Sheets-Sheet 4
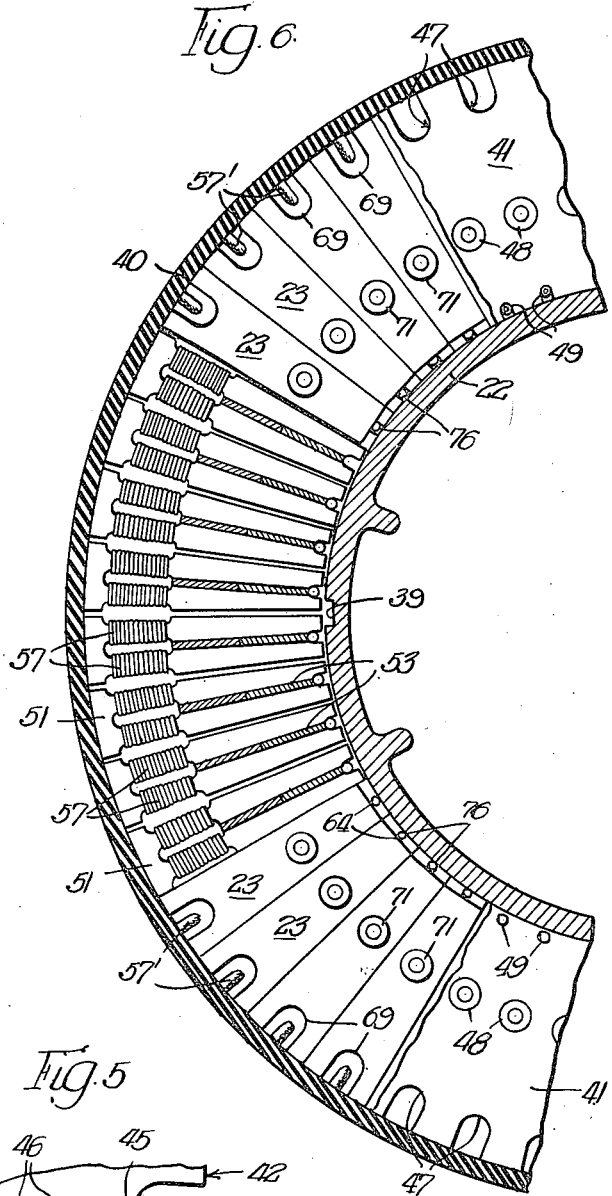
INVENTOR.
Charles H. Lanphier,
BY Brown, Jackson,
Boettcher & Dienner
Attys

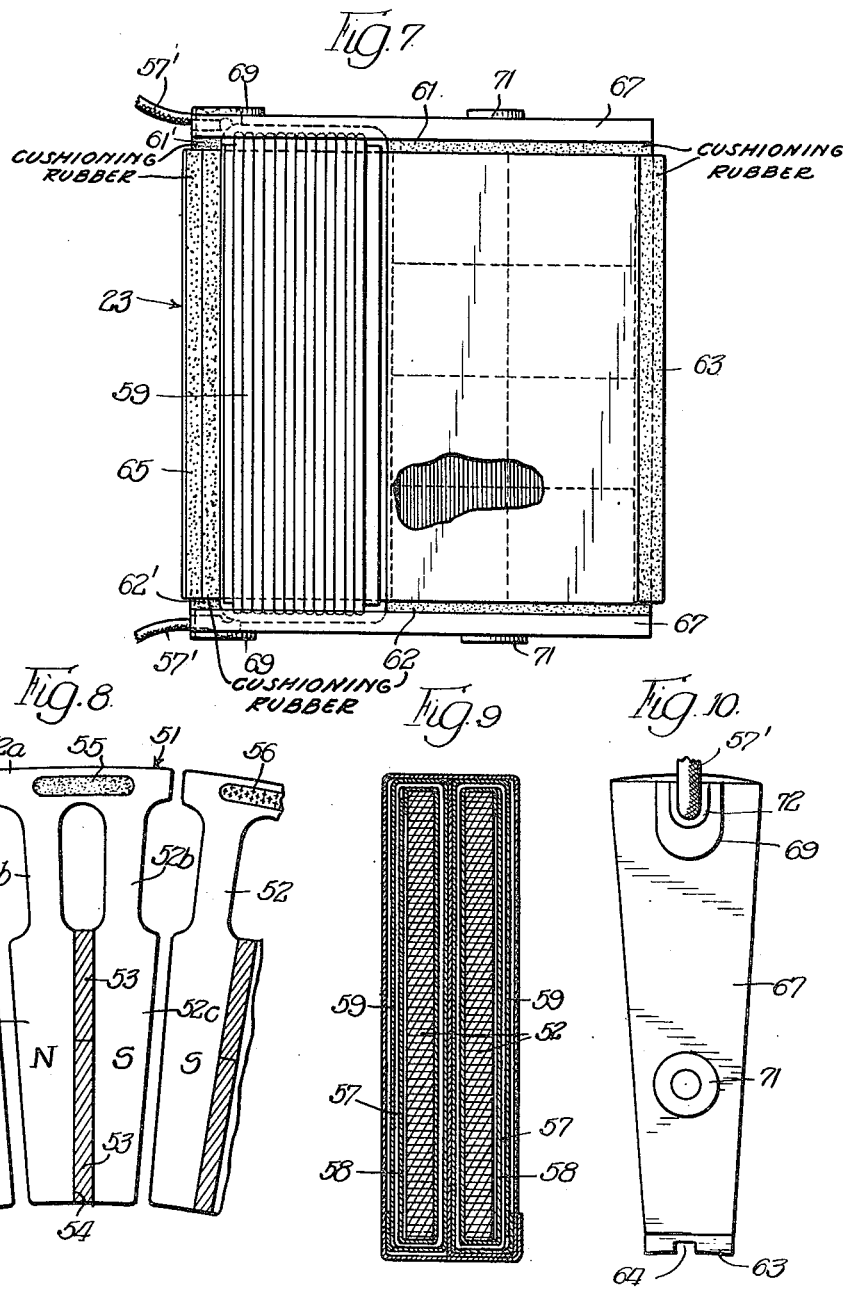

Patented July 11, 1950

2,515,154

UNITED STATES PATENT OFFICE 2,515,154

TRANSDUCER

Charles H. Lanphier, Springfield, Ill., assignor to Sangamo Electric Company, Springfield, Ill., a corporation of Illinois Application July 15, 1946, Serial No. 683,695

6 Claims. (Cl. 177—386)

The present invention relates to an improved transducer of the magnetostrictive type for transmitting and receiving compressional wave energy, i. e., for converting electrical energy into compressional wave energy and for converting compressional wave energy into electrical energy. These transducers are particularly adapted to underwater use in sending and receiving supersonic wave energy for establishing the location of underwater targets. A complete sound echo ranging system for underwater use is disclosed in copending application Serial No. 549,460, filed August 14, 1944. The improved transducer of the present application is intended primarily for use in an underwater sound echo ranging system of the type disclosed in that copending application.

The general object of the present invention is to improve upon the structural features and also upon the method of assembling the group of magnetostrictive elements into the completed transducer so as to produce a transducer which will be efficient, rugged, simple to construct, and easily repaired in the event of accidental damage.

Referring now to the accompanying drawings illustrating one preferred embodiment of the invention:

Figure 5 is a fragmentary detail view of one of the locking keys of the locking ring shown on a larger scale;

Figure 6 is a fragmentary horizontal sectional view taken on different horizontal planes through the assembled transducer showing one of the locking rings and showing some of the magnetostrictive elements in plan and in horizontal section;

Figure 7 is a side elevational view of one of the magnetostrictive elements in its complete form;

Figure 8 is a fragmentary plan view of the core structures of the magnetostrictive elements;

Figure 9 is a vertical transverse view through one of the magnetostrictive elements; and Figure 10 is a plan view of a magnetostrictive element in its complete form.

Figure 1:
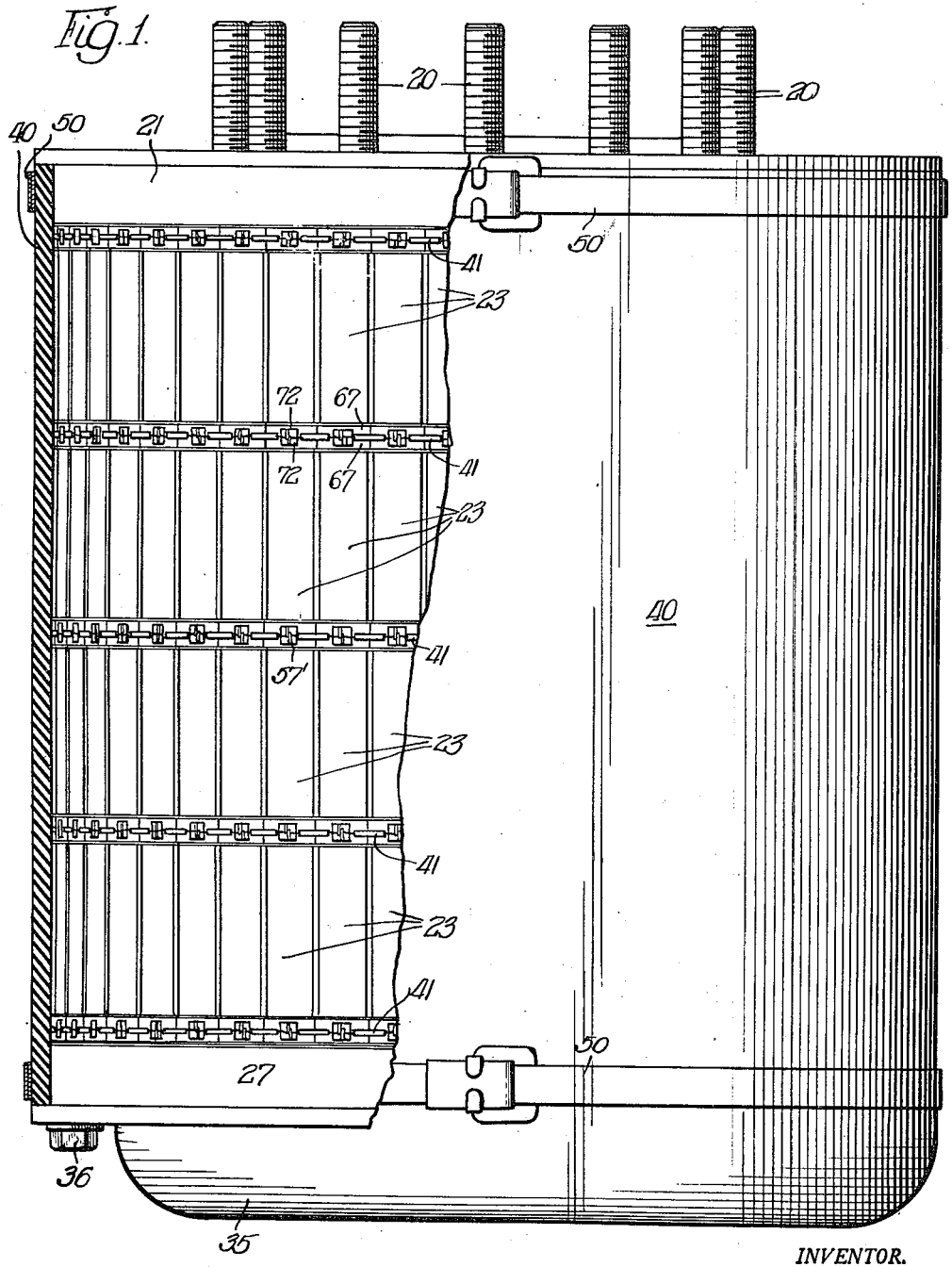
Figure 1 is a side view of the complete transducer, a portion of the rubber boot being broken away to expose the horizontal rows of magnetostrictive elements.
Figure 2:
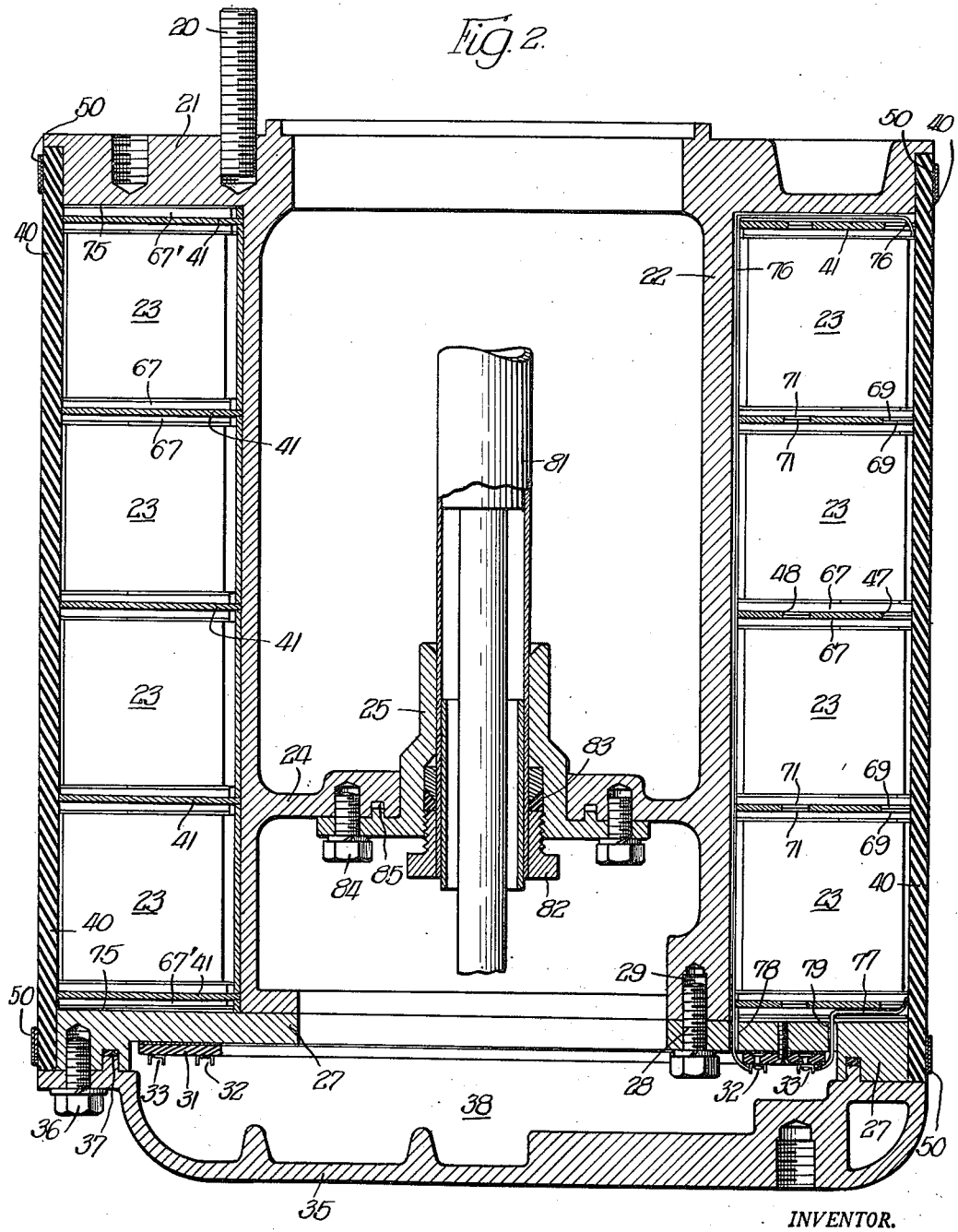
Figure 2 is a vertical axial sectional view through the assembled transducer.
Figure 3:
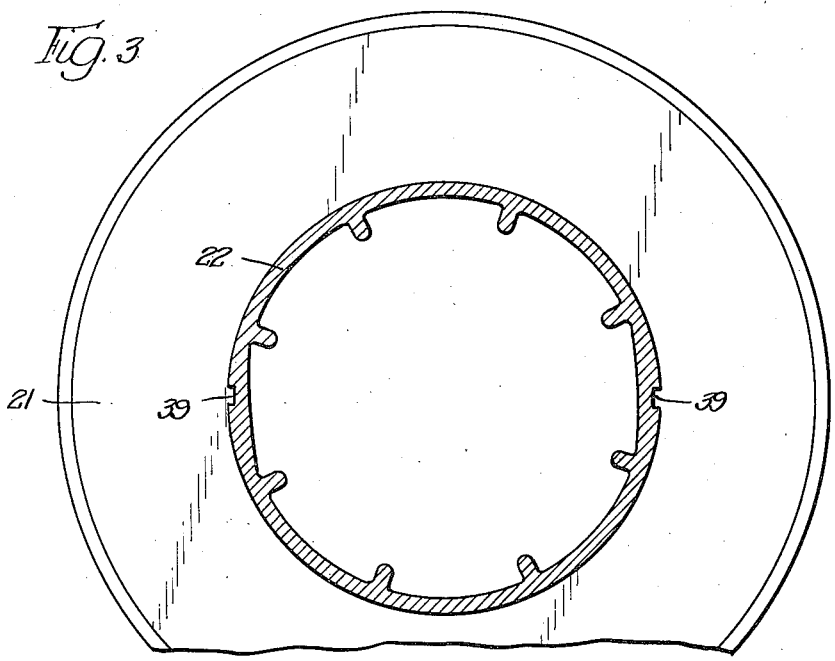
Figure 3 is a sectional view taken transversely through the central supporting shell before the assembly of any magnetostrictive elements thereon.

The transducer, shown in its entirety in Figure 1, is adapted to project down into the water from a ship's hull (not shown), with the axis of the transducer disposed substantially vertically for sending out pulses of compressional wave energy in a more or less horizontal and downward pattern. The studs 20 projecting from the top of the transducer serve to fasten the transducer unit to a suitable mounting ring or plate secured to the ship's hull. These studs 20 extend upwardly from an upper mounting flange 21 formed as part of a stationary cylindrical supporting casting 22 around the outside of which all of the magnetostrictive elements 23 are mounted in radially extending relation. The supporting casting or shell 22 is preferably composed of a non-magnetic stainless steel. As shown in Figure 2, an internal web or flange 24 is formed within the lower part of the shell for supporting a watertight sealing gland 25 through which a multiple conductor cable passes upwardly through the shell, as I shall later describe. A removable end flange 27 is secured to the lower end of the cylindrical shell 22 by cap screws 28 threading up into tapped bores 29 in the lower end of the shell, this end flange preferably being composed of a non-magnetic stainless steel. Secured to the under side of this removable bottom flange 27 is a flat ring of insulating material 31 on which are mounted the terminal connections 32 and 33 for establishing electrical connections with the vertical banks or columns of magnetostrictive elements 23. Closing the entire bottom of the transducer unit is a removable end head 35 which is secured to the removable end flange 27 by cap screws 36, this end head also preferably being composed of a non-magnetic stainless steel. A suitable water-tight sealing gland 37 is effective between the end flange 27 and end head 35 for preventing the entrance of sea water into the enclosed space 38 in which the connector terminals 32 and 33 are disposed. A cylindrical rubber boot 40 is clamped over the upper mounting flange 21 and over the lower end flange 27 by clamping bands 50 for sealing the cylindrical exterior of the transducer from the sea water. As best shown in Figure 3, the cylindrical outer surface of the supporting shell 22 is formed with two diametrically opposite vertically extending key-ways or key slots 39 for holding the locking rings of the assembly against rotative movement, as I shall presently describe.

Figure 4:
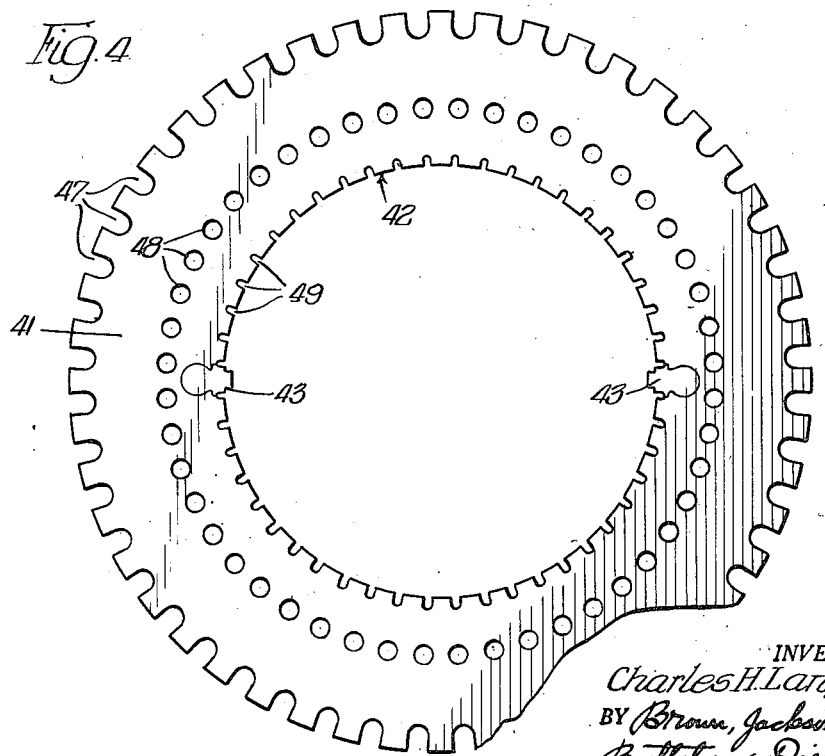
Figure 4 is a plan view of one of the locking rings adapted to be assembled over the central supporting shell.

Referring to Figures 7 to 10 inclusive, illustrating the magnetostrictive units 23 in detail, it will be observed that these units are of relatively narrow segmental shape, as viewed in plan, so that a large number of these units can be assembled radially around the exterior of the supporting shell 22. In the preferred embodiment herein shown, there are 48 of these magnetostrictive elements 23 disposed in each horizontal row around the circumference of the supporting shell 22, and there are four such rows from top to bottom of the shell, making 192 of these elements carried around the outside of the shell. Each horizontal row of magnetostrictive elements is spaced from adjacent rows by disc-like locking rings 41 which have non-rotative keyed connection with the key-ways 39 in the shell 22 and which have locking association with the magnetostrictive elements, whereby these elements are held against rotative movement relatively to the stationary shell and against outward displacement from the shell, and whereby the elements are also indexed vertically in the shell so that the successive vertically spaced magnetostrictive elements are accurately aligned in vertical tiers or columns. These locking rings 41 are also preferably composed of a non-magnetic stainless steel. As shown in Figure 4, each ring 41 has a large central opening 42 which can pass directly over the outer cylindrical surface of the supporting shell 22. At diametrically opposite points, each ring 41 is provided with keys 43 which project inwardly into the opening 42 for sliding reception within the diametrically opposite vertical key-ways 39 formed in the outer surface of the supporting shell 22. Thus, each locking ring 41 is keyed against rotative movement relatively to the supporting shell but can slide lengthwise of the shell. Referring particularly to Figure 5, the keys 43 are preferably constructed as separate stampings which are staked to the locking ring 41. To this end, circular openings 44 are punched in the ring 41 at diametrically opposite points, each of these circular openings connecting with the large central opening 42 through a tapering opening 45. Each key 43 is formed with a corresponding circular portion 44' and a corresponding tapered portion 45' which fit within these openings 44 and 45. The circular portion 44' may have a notched periphery. After the key stamping has been properly assembled in these openings 44 and 45, it is staked in place by punching or staking operations performed on the surrounding metal of the locking ring 41 at spaced points around the circular opening 44, such as in the notches of portion 44', these staked points being indicated at 46.

Each locking ring 41 locks a horizontal circular row of 48 magnetostrictive elements 23 at 48 stations around the circumference of the stationary supporting shell 22. Each of these 48 stations is defined by an outer locking notch 47, an intermediate locking aperture 48, and an inner conductor notch 49, these three being substantially in radial alignment at each of the 48 stations, as clearly shown in Figure 4. Each of the magnetostrictive elements 23 has top and bottom locking projections extending therefrom which fit into the locking notches 47 and locking apertures 48, as will presently appear.

Referring now to the detailed construction of each of the magnetostrictive elements 23, it will be seen from Figure 8 that each unit comprises a magnetic core structure 51 made up of a stack of U-shaped or hairpin-shaped annealed nickel laminations 52. These laminations are cycle welded or otherwise bonded together to form a single structure of sufficient mechanical strength to meet the requirements of handling and service, yet free enough for high acoustical efficiency. In the preferred method of joining the laminations together, the bonding is largely restricted to the peripheral edges of each lamination, which provides the necessary mechanical strength but still avoids strains or modes of vibration detrimental to acoustical efficiency. As shown in Figure 8, each U-shaped lamination 52 comprises a closed end 52a and substantially parallel side legs comprising relatively narrow leg portions 52b and relatively wide leg portions 52c. The radially disposed mounting of the series of magnetostrictive elements around the axis of the supporting shell 22 disposes each of the closed ends 52a outermost, the inward and outward motion of this closed end 52a either being caused electrically for transmitting compressional wave energy to the surrounding water, or being caused by compressional wave energy transmitted back from the water to generate an electrical signal in the magnetostrictive element. Permanent magnets 53 are inserted into the spaces 54 between the relatively wide portions 52c of the side legs, there preferably being two of these permanent magnets in each space 54, but it will be understood that a greater or lesser number may be employed if desired. These permanent magnets are preferably in the form of special oxide slabs. Permanent magnet material sold under the trade names of "Alnico," "Cunico" or "Vectolite" may be used. These permanent magnets serve to provide the necessary polarizing magnetomotive force for maintaining the nickel laminations 52 at the proper degree of polarized magnetization. In order to minimize or prevent the leakage of flux from one magnetostrictive unit to the next adjacent units around the circle, the permanently magnetized polarities of the wide leg portions 52c occur in alternating or reversing sequence from one magnetostrictive unit to the next. That is to say, as clearly shown in Figure 8, a north pole in one leg of one unit will always be adjacent to a north pole in the adjacent leg of the next adjacent unit, and a south pole in one leg of one unit will always be adjacent to a south pole in the adjacent leg of the adjacent unit. Thus, the proximate relationship of like poles between adjacent units will prevent or minimize flux leakage between units. All of the magnetostrictive units are therefore coded in pairs, i. e., those having their north pole in the left hand leg of the U-shaped core structure will have one particular color coding diagrammatically indicated at 55 on the core structure, and the other units having their north pole in the right hand leg of the core structure will have a different color coding diagrammatically indicated at 56. This color coding facilitates rapid assembly of the magnetostrictive elements in their proper relation one to the other. Each vertical column of four magnetostrictive elements (one in each of the four horizontal rows) will be coded alike from top to bottom in the column, i. e., each of these four will have all its north poles in the right hand leg or in the left hand leg correspondingly down through the series. The adjacent vertical columns to each side of this first mentioned column are then reversely coded so that their north poles will be in the opposite legs to the legs of said first mentioned column.

Separate windings 57 are wound on each of the relatively narrow leg portions 52b of the core structure. As shown in Figure 9, the windings are spaced from contact with the laminations by a thin sheet 58 of insulating material, such as neoprene rubber strip, wrapped about each reduced leg portion 52b and cemented together at the ends. The winding operation is started on one leg of the core structure and is made continuous so that in the end an equal number of turns are applied to each leg, beginning at one end of the stack or unit and finishing at the other. Each winding is then covered with an overlapping layer 59 of insulating material, such as varnished cambric tape cemented into place. In the operation of these magnetostrictive elements 29, the permanent magnets 53 establish a polarizing flux which maintains a constant flux polarity in the core structure 51. When the windings 57 are energized by an alternating current, pulsating current or the like, they induce a magnetic field which is superimposed upon the polarizing magnetic field, with the result that the magnetostrictive material in the core structure 51 alternately expands and contracts with the alternations or pulsations in the varying current source traversing the coils. The alternating expansion and contraction of the magnetostrictive material occurs primarily in the radial dimension of the core structure, substantially parallel to the path of flux flow therethrough, and this alternating expansion and contraction is transmitted to the closed outer end portion 52a of the core structure for imparting compressional wave energy to the surrounding sea water. In the case of compressional wave energy transmitted from the sea water back to the closed end 52a of the core structure, the above cycle is reversed. That is to say, the alternating expansion and contraction of the core structure is then induced therein mechanically from the outside compressional wave energy, and this alternating expansion and contraction of the core structure induces a corresponding alternating or pulsating current flow in the coils 57. The operating theory of the magnetostrictive units, particularly when employed in conjunction with a complete underwater sound detection system, is fully disclosed in the aforementioned copending application of Oscar H. Schuck and Leon G. S. Wood, Serial No. 549,460. Magnetostrictive elements having the same general principle of operation are also disclosed in Patent No. 2,391,678, issued December 25, 1945, to Francis P. Bundy.

Referring again to the mounting of these 192 magnetostrictive elements in the complete transducer, each of these magnetostrictive elements has a unique cushioned mounting so as to acoustically insulate each element from the stationary supporting shell 22 and from every other magnetostrictive element in the assembly. Thus cushioned mounting is preferably obtained by cementing strips of sponge rubber or like cushioning material to the top and bottom of each magnetostrictive unit, and also to the outer and inner ends thereof. For example, a strip 61 of sponge rubber is cemented across the top of each unit to cover the area of the relatively wide leg portions 52c and the intervening permanent magnets 53.

At a point outwardly beyond the windings 57, another relatively narrow strip of sponge rubber 61' is cemented to extend across the top of the closed end portion 52a of the core structure. This same practice is followed at the bottom of the unit; a strip 62 being cemented to cover the wide leg portions 52c and magnet slot 54, and a narrow strip 62' being cemented across the bottom of the closed end portion 52a of the core structure. Another strip 63 of this sponge rubber is cemented to the inner face of the unit assembly, this strip covering the inner ends of the core legs and extending across the slot 54 in which the permanent magnets are disposed. As best shown in Figure 10, a vertically extending channel-shaped groove 64 extends downwardly in the exposed side of this cushion strip 63 for receiving an electrical conductor connecting with the lower end of the vertical column of magnetostrictive units, as will be later described. The above described cushioning strips are preferably composed of Corprene. The outer face of the unit extending vertically downwardly across the outer side of the closed end portion 52a is also faced with a rubber facing 65 cemented to the core structure. This outer rubber facing is preferably composed of rho"C"rubber. Acoustical contact with the sea water is established through this rubber facing 65 and through the cylindrical rubber boot 40 which completely surrounds the assembly of magnetostrictive units.

Referring now to the manner of anchoring or locking each of these magnetostrictive units between upper and lower locking rings 41, it will be seen that each unit has an end plate or locking cap 67 cemented to the upper cushioning strips 61 and 61', and also has a similar end plate or locking cap 67 cemented to the lower cushioning strips 62 and 62'. These two locking caps are preferably composed of Bakelite or some similar material, and they may be identical, if desired. Projecting vertically from the outer portion of each of these end plates or caps 67 is a U-shaped locking lug 69 which is adapted to fit snugly into the associated U-shaped locking slot 47 of the adjacent locking ring 41. Also projecting from the outer surface of each end plate or locking cap 67 is a circular locking lug 71 which is adapted to have relatively snug fit in the circular locking aperture 48 of the adjacent locking ring 41. Thus, these projections or lugs 69 and 71 serve as locating or registration devices by means of which each magnetostrictive unit is held in its properly located radially extending relation between the locking rings 41. In each of the U-shaped locking lugs 69 at top and bottom of the unit there is provided a relatively large opening or hole 72 extending through the body of the locking cap for enabling the terminal conductors 57' of the coils 57 to be electrically connected with corresponding terminal conductors of upper and lower magnetostrictive units. These conductors 57' are adapted to be soldered to the corresponding conductors of upper and lower units, and then pushed or tucked back into the enlarged openings 72 in the locking caps 67, whereby all of the coils of the four magnetostrictive elements in each vertical column are connected in series down through the column. This soldering operation is performed after all of the magnetostrictive elements are in their assembled positions around the supporting shell 22.

Referring now to the preferred manner of assembling all of the parts for producing the complete transducer shown in Figure 1, the supporting shell 22 is first up-ended and placed in inverted position upon an assembly surface so that the end flange 21 which normally forms the upper end of the transducer is now lowermost. At this time the other removable flange 27 and end cap 35 are not in place on the shell 22, whereby the free end of the shell is ready to have the locking rings 41 slipped down over it. An insulating ring or washer 75, composed of Corprene or other suitable insulating material, is first slipped down over the shell 22 so as to lie in contact with the end flange 21. A series of 48 insulated conducting wires 76 is now assembled around the shell, there being one of these conductors 76 for each of the 48 vertical columns of magnetostrictive units. One end of each of these conductors is extended out across the insulating disc 75 in position for making electrical contact with one end of each of these columns of magnetostrictive units. A series of 48 end plates 67', somewhat similar to the construction shown at 67 in Figures 7 and 10, are now assembled in radially extending relation around the supporting shell 22, these end plates 67' having channels through which the conductors 76 may pass from each element 23 down through the openings 64 and 49 to the connection plate 31, as shown. A locking ring 41 is now slipped down over the supporting shell 22, with its keys 43 engaging in the key-ways 39 of the shell, and with its locking slots and locking openings 47 and 48 engaging over the locking projections 69 and 71 of the end plates 67'. The next step in the assembly operation is to position the first circular row of magnetostrictive elements 23 upon the upper face of this first locking ring 41. In placing these 48 elements in their proper stations or locations on this first locking ring, the U-shaped locking lugs 69 of the end plates 67 are placed in registration with the U-shaped locking notches 47 of the ring 41, and the circular locking lugs 71 are dropped down into the circular locking holes 48 of the ring. Thus, all 48 magnetostrictive elements of this first circular row are properly indexed with respect to the axially extending key-ways 39 of the stationary supporting shell 22. Thereupon, another locking ring 41 is slipped down over the shell 22 with its locking keys 43 engaging in the keyways 39. The U-shaped locking notches 47 and the circular locking holes 48 of this second ring are brought down over the locking lugs 69 and 71 projecting from the end plates 67 of this first row of magnetostrictive elements, whereby this first row is thus locked in place between these two spaced locking rings 41. As will be seen from Figure 2 of the drawings, the sectional depth of the locking slots 47 and holes 48 in the locking rings 41 is substantially twice the height of the lugs 69 and 71 so as to accommodate the lugs of upper and lower rows of magnetostrictive elements. In these operations of assembling the magnetostrictive elements and the locking rings, the vertically extending inner terminal conductors 76 provided for each vertical column or tier of magnetostrictive elements remain pressed against the supporting shell 22, and as each magnetostrictive element is assembled in place its notch 64 is placed in registry over the corresponding conductor 76, and as each locking ring 41 is assembled in place its inner notches 49 receive the series of conductors 76 in distributed relation around the supporting shell. A second row of magnetostrictive elements 23 is now assembled upon the upper face of the second locking ring 41 in the same manner described above of the first row of magnetostrictive elements. Following this, the third locking ring 41 is assembled down over the second row of magnetostrictive elements, and this same operation is repeated until all four rows of magnetostrictive elements have been assembled around the shell 22 in the relation shown in Figure 2. The last or fifth locking ring 41 is then assembled over the last row of magnetostrictive elements, and upon this last locking ring is assembled a ring of end plates 67' and another insulating washer 75, whereby to form channels through which outer terminal conductors 77 may be extended from each of the magnetostrictive elements of the fourth or last row. These insulated conducting wires 77 are adapted to extend through holes 79 in the removable end flange 27 for connection with the associated outer terminal clips 33 mounted on the insulating terminal ring 31. The inner terminal conductors 76 leading from the other end of each tier of magnetostrictive units are also passed through holes 78 in the removable end flange 27 for connection with the inner terminal clips 32. After the conductors 76 and 77 have been threaded through the holes 78 and 79, this removable end flange 27 can be bolted to the end of the supporting shell 22 through the medium of the cap screws 28 for securing the entire assembly of magnetostrictive elements and locking rings in place upon the supporting shell 22. The four magnetostrictive elements in each vertical column constitute what may be termed a "stave," there being 48 of these staves around the entire transducer assembly. It will be seen from the foregoing assembly operations that the four magnetostrictive elements in each of these staves are connected in series, there being an inner terminal conductor 76 connected to an end magnetostrictive element at one end of the stave, and an outer terminal conductor 77 connected to an end magnetostrictive element at the other end of the stave, these two conductors being then connected to the inner and outer terminals 32 and 33 on the insulating ring 31. The successive magnetostrictive units in each vertical column or stave are connected together in series by bringing the terminal conductors 57' together at the upper and lower edges of the units and soldering these terminal ends together, as previously described. These soldered ends are then tucked back into the pockets or openings 72 in the insulating end plates 67, such openings giving ample electrical insulation to these soldered terminals.

The 48 columns or staves are now connected with their appropriate conductors leading up through the large cable 81 shown in Figure 2, such cable conductors being soldered or otherwise secured to the terminal clips 32 and 33 for each column or stave of magnetostrictive elements. As shown in Figure 2, the sheath of this cable is sealed within the sealing gland 25 by the action of a gland nut 82 and compressible gland packing 83. The gland sleeve 25 is detachably secured to the internal web 24 by cap screws 84, a watertight sealing ring 85 being interposed between the gland sleeve 25 and the web 24.

After all of the connections have been made with the conductors in the cable 81, the removable end head 35 can then be placed in position over the end of the entire assembly and secured in place by the cap screws 36. The outer rubber boot 40 is now applied over the entire circumferential assembly of magnetostrictive units, the upper end of this boot being clamped to the upper mounting flange 21 by an upper clamping band 50, and the lower end of the boot being clamped to the removable bottom flange 27 by a similar lower clamping band 50. The complete transducer unit is now ready for attachment to the hull of a ship through the studs 20.

The electrical connections from the transducer staves lead through the cable 81 to a capacitative commutator which is referred to briefly in the copending application of Schuck and Wood above referred to, and one particular embodiment of which I have disclosed in my copending application Serial No. 683,694, filed July 15, 1946, on "Capacitative Commutator."

While I have illustrated and described what I regard to be the preferred embodiment of my invention, nevertheless it will be understood that such is merely exemplary and that numerous modifications and rearrangements may be made therein without departing from the essence of the invention.

I claim:

1. In a transducer of the class described, the combination of a central supporting shell, a plurality of horizontal rows of magnetostrictive elements arranged circularly around said shell, locking rings engaging over said shell above and below each row of magnetostrictive elements, each of said locking rings having locking apertures therein at angularly spaced points, locking lugs projecting from each of said magnetostrictive elements engaging in said locking apertures, and electrical terminal connections for the coils on each magnetostrictive element projecting outwardly through said locking lugs for effecting electrical connection between adjacent magnetostrictive elements.

2. In a transducer of the class described, the combination of a central supporting shell, a plurality of horizontal rows of magnetostrictive elements arranged circularly around said shell, each of said magnetostrictive elements comprising an independent U-shaped core disposed substantially radially of said shell with the closed end of the core facing outwardly, a permanent magnet between the side legs of each core, windings on said side legs between the permanent magnet and the closed end of the core; locking rings engaging over said shell above and below each row of magnetostrictive elements, each of said locking rings having locking apertures therein at angularly spaced points, locking lugs projecting from each of said magnetostrictive elements engaging in said locking apertures, and electrical terminal connections for the windings on each magnetostrictive element projecting outwardly through said locking lugs for effecting electrical connection between adjacent magnetostrictive elements.

3. In a transducer of the class described, the combination of a central supporting shell, a plurality of circular locking rings assembled over said shell in longitudinally spaced relation thereon, keying means for preventing rotative movement between said rings and said shell, said rings having outer locking notches in their outer peripheries and also having inner locking apertures between their outer and inner peripheries, rows of magnetostrictive elements assembled circularly around said shell between adjacent pairs of locking rings, the vertically spaced magnetostrictive elements of adjacent rows being aligned in vertical columns, outer locking lugs projecting upwardly and downwardly from the top and bottom respectively of each magnetostrictive element engaging in said outer locking notches of the locking rings disposed above and below said magnetostrictive element, inner locking lugs projecting upwardly and downwardly from the top and bottom respectively of each magnetostrictive element engaging in said inner locking apertures of the locking rings disposed above and below said magnetostrictive element, each of said magnetostrictive elements comprising a coil, and electrical connections joining the coils of all of the magnetostrictive elements in each vertical column, said electrical connections extending from each magnetostrictive element vertically to the next adjacent magnetostrictive element in the column and extending across the outer edge of the adjacent locking ring.

4. In a transducer of the class described, the combination of a central supporting shell, a plurality of circular locking rings assembled over said shell in longitudinally spaced relation, keying means for preventing rotative movement between said rings and said shell, said rings having pairs of outer locking openings and inner locking openings in angularly spaced relation around said rings, rows of magnetostrictive elements assembled circularly around said shell between adjacent pairs of locking rings, the vertically spaced magnetostrictive elements of adjacent rows being aligned in vertical columns, each of said magnetostrictive elements comprising an individual core structure and an individual winding mounted thereon, cushioning material secured to the top and bottom of each core structure, top and bottom mounting plates secured to the cushioning material at the top and bottom of each core structure, and outer and inner locking lugs projecting upwardly from each upper mounting plate and downwardly from each bottom mounting plate and engaging in said outer and inner locking openings in adjacent locking rings.

5. In a transducer of the class described, the combination of a central supporting shell, a plurality of circular locking rings assembled over said shell in longitudinally spaced relation, keying means for preventing rotative movement between said rings and said shell, said rings having locking openings therein, rows of magnetostrictive elements arranged circularly around said shell between adjacent pairs of locking rings, the vertically spaced magnetostrictive elements of adjacent rows being aligned in vertical columns, each of said magnetostrictive elements comprising a U-shaped core disposed substantially radially of said shell with the closed end of the core facing outwardly, permanent magnets between the side legs of the cores, windings on said side legs between the permanent magnets and the closed ends of the cores, top and bottom mounting plates secured to the top and bottom sides of each U-shaped core, and locking lugs projecting from said top and bottom mounting plates engaging in said locking openings of adjacent locking rings.

6. In a transducer of the class described, the combination of a central supporting shell, a plurality of circular locking rings assembled over said shell in longitudinally spaced relation, keying means for preventing rotative movement between said rings and said shell, said rings having locking openings therein, rows of magnetostrictive elements arranged circularly around said shell between adjacent pairs of locking rings, the vertically spaced magnetostrictive elements of adjacent rows being aligned in vertical columns, each of said magnetostrictive elements comprising a U-shaped core disposed substantially radially of said shell with the closed end of the core facing outwardly, a winding on said core, strips of cushioning rubber secured to the top and bottom surfaces of said core, top and bottom mounting plates secured to said top and bottom strips of rubber, and locking lugs projecting from said top and bottom mounting plates and engaging in said locking openings of the adjacent locking rings.

CHARLES H. LANPHIER.

REFERENCES CITED

The following references are of record in the file of this patent:

UNITED STATES PATENTS

| Number | Name | Date |
|---|---|---|
| 985,524 | Gray | Feb. 28, 1911 |
| 1,941,477 | Jensen | Jan. 2, 1934 |
| 1,985,251 | Hayes | Dec. 25, 1934 |
| 2,014,411 | Pierce | Sept. 17, 1935 |
| 2,190,666 | Kalimeyer | Feb. 20, 1940 |
| 2,249,835 | Lakatos | July 22, 1941 |
| 2,405,605 | Goodale et al. | Aug. 13, 1946 |

FOREIGN PATENTS

| Number | Country | Date |
|---|---|---|
| 49,261 | France | Nov. 12, 1938 |
| 818,828 | France | June 10, 1936 |